United States Patent [19]

Faber

[11] Patent Number: 4,623,782

[45] Date of Patent: Nov. 18, 1986

[54] COMPUTER SYSTEM WHEREIN CONTROL SEGMENT OF INFORMATION LOADS THE TASK IN THE COMPUTER AND DATA SEGMENT OF THE INFORMATION EXECUTES THE TASK LOADED IN THE COMPUTER

[75] Inventor: Lawrence Faber, Sunnyvale, Calif.

[73] Assignee: Modi Partnership, Sunnyvale, Calif.

[21] Appl. No.: 474,532

[22] Filed: Mar. 11, 1983

[51] Int. Cl.⁴ .............................................. G06K 9/00
[52] U.S. Cl. .................................................. 235/379
[58] Field of Search ....................... 364/200, 900, 300; 235/379

[56] References Cited

U.S. PATENT DOCUMENTS

| | | | |
|---|---|---|---|
| 3,111,646 | 11/1963 | Harmon et al. | 340/146.3 |
| 3,142,039 | 7/1964 | Irland | 340/146.3 |
| 3,292,489 | 12/1966 | Johnson et al. | 88/24 |
| 4,158,194 | 6/1979 | McWaters et al. | 340/146.3 |
| 4,190,833 | 2/1980 | Bejting et al. | 340/707 |
| 4,238,792 | 12/1980 | Cohen et al. | 340/707 |
| 4,243,972 | 1/1981 | Toussaint | 340/146.3 |
| 4,325,117 | 4/1982 | Parmet et al. | 364/200 |
| 4,329,684 | 5/1982 | Monteath et al. | 340/707 |

*Primary Examiner*—Gareth D. Shaw
*Assistant Examiner*—John G. Mills
*Attorney, Agent, or Firm*—Jack M. Wiseman

[57] ABSTRACT

Computer system comprising an optical reader for reading information from a document. The reader enters into a computer the control segment of the information read to load a task into the computer. Substantially simultaneously, the reader enters into the computer the data segment of the information read to execute the task loaded into the computer in a single operational step.

6 Claims, 2 Drawing Figures

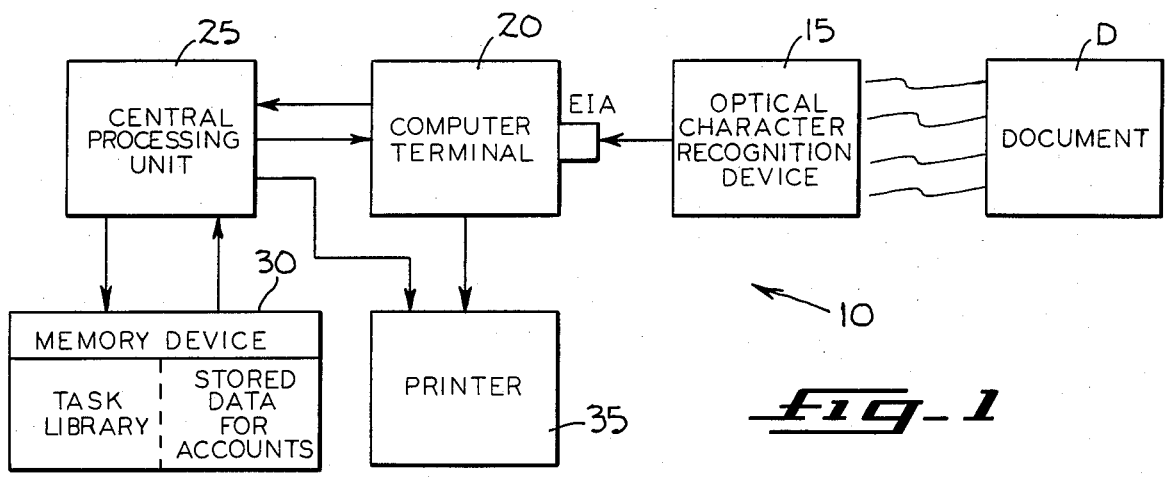
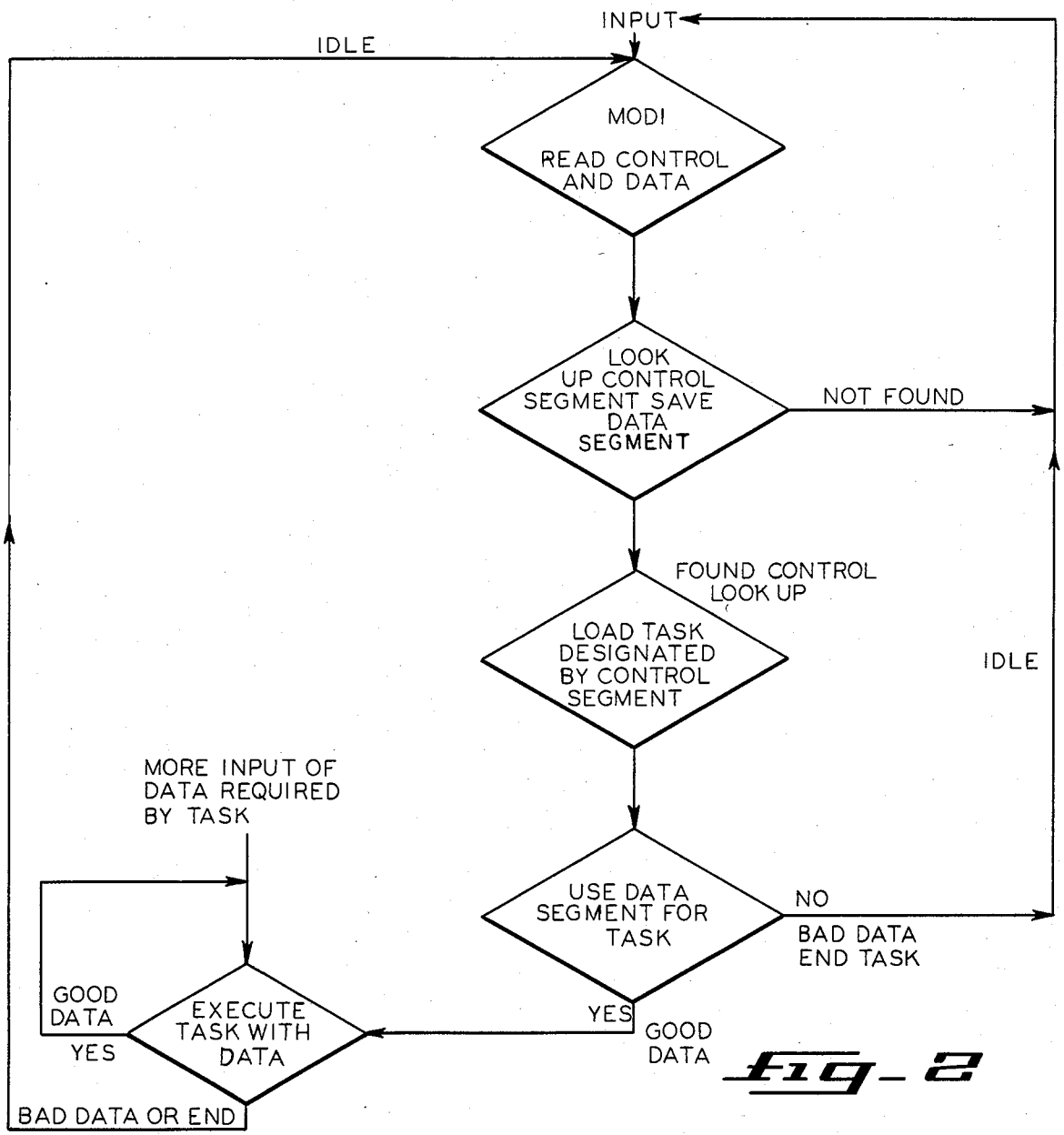

4,623,782

COMPUTER SYSTEM WHEREIN CONTROL SEGMENT OF INFORMATION LOADS THE TASK IN THE COMPUTER AND DATA SEGMENT OF THE INFORMATION EXECUTES THE TASK LOADED IN THE COMPUTER

BACKGROUND OF THE INVENTION

The present invention relates in general to computer systems, and more particularly to a data processing system in which a reader reads the control segment and the data segment of information The patent to McWaters et al., U.S. Pat. No. 4,158,194, discloses an optical scanner to information from a document. In the patent to Bejting et al., U.S. Pat. No. 4,190,833, there is disclosed an optical scanner. The output of the optical scanner is applied to a converter that produces digital code word corresponding to the information read by the optical scanner. The digital code information is stored in a text generator. A character generator reads the digital code information stored in the memory of the text generator and produces an alphanumerical signal for displaying characters on a cathode ray tube.

In the patent to Johnson et al., U.S. Pat. No. 3,292,489, there is disclosed an optical scanner that reads an optical code, which is juxtaposed with data information displayed on a cathode ray tube. The optical scanner produces a series of pulses in accordance with the optical code scanned. The pulses are received by a computer which controls the generation of data information to be displayed on the cathode ray tube. The pulses emitted by the optical scanner can address a storage device in the computer to retrieve the desired data information under the command of the optical code scanned by the optical scanner.

The patent to Cohen et al., U.S. Pat. No. 4,238,792, discloses a system in which a light pen changes the alphanumeric values of certain information displayed on a cathode ray tube. An operator touches a character on the cathode ray tube adjacent to parameters. The parameters next to the touched character will be identified. The alphanumeric values of the parameters are incremented or decremented dependent on the position of the character.

Heretofore, an operator of a computer or data processing system utilized repeatedly the same tasks to process repetitive information. Control information was entered into the computer by an operator through a keyboard to load the computer with a particular task. The data information was then entered into the computer by the operator in response to the direction or "prompting" of the computer appearing on a display, such as a cathode ray tube. As a consequence thereof, the operator speed was reduced by the plural step procedure. In addition, accuracy was impaired by the plural step procedure.

SUMMARY OF THE INVENTION

A computer system in which an optical character recognition device reads information containing a control segment and a data segment. The optical character recognition device enters the control information into the computer to load a task in the computer and enters the data information into the computer to execute the task that was loaded into the computer.

A feature of the present invention is that the optical character recognition device reads substantially simultaneously the control segment of the information and the data segment of the information in a single operational step. The optical character recognition device enters into the computer the control information to load the computer with a task and enters the data information into the computer to execute the task that was loaded into the computer. The foregoing is carried out in a single operational step. Thus, the control information and the data information are linked for correlation without prompting from the computer. The optical character recognition device reads the control information and the data information substantially simultaneously for entry into the computer in a single operational step. The computer uses the control information to load a task into the computer, while using the data information to automatically execute the task without prompting an operator to enter the data information.

As a consequence of the foregoing, an operator's speed is increased and the accuracy of the operator is improved.

DESCRIPTION OF THE DRAWINGS

FIG. 1 is a block diagram of the computer system embodying the present invention.

FIG. 2 is a diagrammatic illustration of a computer program flow chart employed in a central processing unit of the computer system illustrated in FIG. 1 in a operational mode.

DETAILED DESCRIPTION OF A PREFERRED EMBODIMENT

Illustrated in FIG. 1 is a computer system 10 embodying the present invention, which may be in the form of a data processing system. The computer system 10 comprises a conventional optical character recognition device 15 or a well-known optical scanner for reading documents. In the preferred embodiment, the optical character recognition device is a well-known optical character recognition wand manufactured and sold by Caere Corporation of Los Gatos, Calif., as the Caere Model 862 OCR wand.

The optical character recognition device 15 reads analog information on a document D. The information on the document D may be, in the preferred embodiment, OCRA font style. It may also be in OCRB font style, script, code, analog information in the form of alphanumeric characters or any optically scannable characters. The optical character recognition device 15 converts the analog information read on the document D into digital control information and into digital data information. Thus, the analog information on the document D has both a control segment and a data segment, which in the preferred embodiment, is read substantially simultaneously by the optical character recognition device 15 and entry is made in a single operational step.

Included in the optical character recognition device 15 is a read-only memory (PROM) that selects digital signals or digital information from the recognition of a particular analog character read by the optical character recognition device 15. Thus, the optical character recognition device 15 converts the control segment of the analog information read from the document D into digital control information and substantially simultaneously converts the data segment of the analog information read from the document D into digital data information and entry is made in a single operational step.

The digital control information and the digital data information are applied to a suitable computer terminal 20 through a suitable interface, such as a conventional EIA RS232 interface. The computer terminal 20 includes a conventional cathode ray tube, keyboard and video display circuits. In the preferred embodiment, the computer terminal 20 is manufactured by Data Media of Pennsauken, N.J., as Model Color Scan 10, which is marketed as a VT100 equivalent. The interaction between the cathode ray tube of the computer terminal 20 and the optical character recognition device 15 is the same as if the digital control information and the digital data information were applied through a keyboard.

The digital control information and the digital data information applied to the computer terminal 20 are applied to a suitable computer, such as a central processing unit 25. The central processing unit 25, in the preferred embodiment, is a Digital Equipment Corporation PDP 11/44 data processor. The instructions for operating the central processing unit will be described hereinafter with respect to the flow chart illustrated in FIG. 2.

The central processing unit 25 receives the control information from the computer terminal 20. Thereupon, the central processing unit 25 addresses the memory device 30 and retrieves the task information from a memory device 30. The memory device 30, in the exemplary embodiment, comprises an on-line storage task library, which stores various task instructions for each control segment, respectively, of the information read from the document D and is also a storage device for storing data for the various accounts. The central processing unit 25 reads the instructions in the online storage task library at the address designated by the control information for handling data information stored in the memory device 30 in connection with the various accounts. The memory device 30, in the preferred embodiment, is a Control Data Corporation 9762 disk drive with 80 megabytes of disk storage.

The central processing unit 25 carries out the instructions from the program stored therein and carries out the task to which it was addressed in the task library of the memory device 30. The processed information on the various accounts which is selected by both the task and the data for executing the task is then displayed at the computer terminal 20 and may be printed out by a printer 35. The printer 35, in the preferred embodiment, is an NEC Information Systems, Inc. 7725 printer with OCRA font print elements. In the preferred embodiment, a suitable disc for the central processing unit 25 stores the object code for the software program shown in FIG. 2.

From the foregoing, it is to be observed that the optical character recognition device 15 reads substantially simultaneously from the document D control segment of information and data segment of information and entry is made in a single operational step. The central processing unit 25 receives the control segment of information to address the task library in the memory device 30 to load a task in the central processing unit 25 and receives simultaneously in a single step operation the data segment of the information read by the optical character recognition device 15 to execute the task that was loaded in the central processing unit 25 so that the central processing unit 25 transmits data stored in the memory device 30 prompted by the task selected and the selected execution of the task. The central processing unit 25 in executing a particular task uses the data stored in the memory device 30 for accounts which was selected by the designated task loaded in the central processing unit 25 and selected by the data information for the execution of the task. The data stored in the memory device 30 for accounts, which has been selected by the designated task loaded in the central processing unit 25 and selected by the data information for the execution of the task, can be printed out by the printer 35 or displayed at the computer terminal 20. The stored data can be modified, can be erased et cetera by the operation of the keyboard of the computer terminal 20 in a well-known manner.

The software provided by Digital Equipment Corp. as part of the PDP 11/44 computer 25 includes the following:
RSX11M+VER. 2.0 operating system,
Fortran 77 version 4.0 compiler and
RMS 11 file management system.

The storage device storing an object code of the program illustrated in FIG. 2 is in addition to the software provided by the manufacturer as part of the central processing unit 25.

In the operation of the computer system 10, the computer system 10, in the exemplary embodiment, operates as a data processing unit for billing accounts receivable. Initially, each account will be designated an account number and each account number will be recognized by the optical character recognition device 15 in OCRA font style and subsequently by the central processing unit 25 in digital form. The optical character recognition device 15 reads a character on the document D. The read-only memory (PROM) in the optical character recognition device 15 responds to the character read and designates the number of digits assigned to the character read by the optical character recognition device 15. As a consequence thereof, the optical recognition device 15 is instructed to look for the number of digits designated by the read-only memory, which digits are to succeed the character initially read substantially simultaneously by the optical character recognition device 15 in a single operational step.

In the exemplary embodiment, the character A signifies that eleven data digits will follow the control character or control characters. Thus, the optical character recognition device 15 will read A11234567890 in which A1 are the control characters and 1234567890 are the data digits for indicating the account number. The data digits will be written by the central processing unit 25 as 1234567890 for a particular account, which represents the data segment of the information read by the optical recognition device 15 for the particular account.

If the task to be loaded into the central processing unit 25 is to charge transactions against the designated account, the control segment of the information can be designated by the characters A1. The data segment of the information can be the ten digits 1234567890. Thus, the optical character recognition device 15 will read A11234567890 in which A is the control character for the optical character recognition device 15 to read eleven digits; A1 are the control characters to designate a charge transaction task; and the digits 1234567890 are the data digits to designate the account number. The data digits will be written by the central processing unit 25 as 1234567890 for a charge transaction for the particular account.

If the task to be loaded into the central processing unit 25 is to display the status of the designated account, the control segment of the information can be designated by the characters A2. The data segment of the information can be the ten digits 1234567890 for designating a particular account. Thus, the optical character recognition device 15 will read A21234567890, in which A2 are the control characters and which A is the control character for the optical character recognition device 15 to read eleven digits; A2 are the control characters to designate the task of displaying the status of the designated account; and the digits 1234567890 are the data digits designating a particular account. The data stored in the memory device 30 for the particular account, which is selected by the task loaded into the central processing unit 25 and the account selected by the data information for the execution of the task will be transmitted by the central processing unit 25 to comply with the specification of the task loaded in the central processing unit 25. The printer 35 and the cathode ray tube of the computer terminal 20 will display in alphanumeric characters the data stored in the memory device 30 for the particular account, which was selected by the task loaded into the central processing unit 25 and the account selected by the data information for the execution of the task, as transmitted by the central processing unit 25.

The document D, for example, could have the control characters and the account number printed in OCRA font in two formats, namely:

A11234567890 (item 1)

A21234567890 (item 2).

Should the optical character recognition device 15 be positioned confronting item 1, the central processing unit 25 will receive the digital signals transmitted through the computer terminal 20. The central processing unit 25 will receive the digital sequence of A11234567890. Thereupon, central processing unit 25 will recognize two segments of item 1, namely: the control segment and the data segment. The control segment is the digital representation of the characters A1 and the data segment is the digital representation of the data characters 1234567890. At this time, the central processing unit 25 addresses the task library in the memory device 30 in accordance with the digital signals representing the control characters A1 to receive the task instructions. The central processing unit 25 receives the task instructions from the memory device 30 and loads the central processing unit 25 with the task assigned to the control characters A1, namely: charge transaction against account.

The data information 1234567890 received by the central processing unit 25 in digital form designates to the central processing unit 25 which account number the transaction is to be charged against. If the next entry from the document D is one the task designated by the control characters A1 expects, then the task instructions to the central processing unit 25 continues. If the next entry from the document D is one the task designated by the control characters A1 does not expect, then the central processing unit 25 ends the designated task selected by the control characters A1 and then splits the information read by the optical character recognition device 15 into two segments, namely: control characters and data characters. The central processing unit 25 repeats the cycle of obtaining task instructions from the memory device 30 and uses the data characters to designate the new task for instructions from the memory device 30.

If the central processing unit 25 receives the digital representation of A21234567890, the central processing unit 25 will split the information into the control characters A2 and the data characters 1234567890. The central processing unit 25 addresses the task in the task library of the memory device 30 designated by the control characters A2 for receiving task instructions from the memory device 30. Now, the central processing unit 25 loads into the central processing unit 25 the task instructions for status display for an account. The central processing unit 25 receives the data segment 1234567890 to transmit the status display for the account 1234567890 which was stored in the memory device 30 for the particular account. The central processing unit 25 is instructed by the memory device 30 to end the task designated by the control characters A2 or any other task when unexpected data is read by the central processing unit 25.

From the foregoing, it is to be observed that the computer system 10 of the present invention obviates the need for two step operation of entering control information and responding with data information, i.e. account number, when prompted by the cathode ray tube at the computer terminal 20. The present invention provides a single step process through an optical character recognition device that enables the control characters to provide the task instructions. Thereupon, the account number and related data is processed without any prompting by the cathode ray tube at the computer terminal.

Illustrated in FIG. 2 is the flow chart for the program employed in the central processing unit 25, which is in addition to the software provided by the manufacturer as part of the central processing unit. The document D (FIG. 1) has printed thereon analog information in optically recognizable font, such as OCRA or OCRB.

The optical character recognition device 15 reads selected information in analog form on the document D. Further, the optical character recognition device 15 scans the printed selected information in analog form on the document D and compares the scanned image with the read-only memory (PROM) in the optical character recognition device 15. In addition, the optical character recognition device 15 reads the first character for determining the number of characters in the selected analog information to be read and then reads the remaining characters to determine the correctness of the number of succeeding characters.

If the number of succeeding characters in the information read is correct, the optical character recognition device 15 applies digital representations to the computer terminal 20 via the EIA RS 232 input interface of the characters read by the optical character recognition device 15. The digital information is advanced through the computer terminal 20 and is received by the central processing unit 25.

The object code of the program illustrated in FIG. 2 may be stored in a suitable memory device, which may be installed in the central processing unit 25 as an operating system for giving instructions to the central processing unit. The object code derived from the program illustrated in FIG. 2 is in addition to the object code provided by the manufacturer of the central processing unit 25 as part of the central processing unit 25.

The central processing unit 25 receives the digital signals from the computer terminal 20 and compares the control segment of the digital information with the information stored in the memory device 30 for the task library. If the comparison shows an error, the program (FIG. 2) instructs the central processing unit 25 to ignore the digital signals and return to an idle state. If the comparison does not indicate an error, then the program (FIG. 2) instructs the central processing unit 25 to load the task located in the memory device 30 into the central processing unit 25. The task loaded in the central processing unit 25 instructs the central processing unit 25 to use the data segment of the digital information received via the computer terminal 20 to transmit without prompting the first data sought, i.e. the account number designated by the read data information.

If the data segment of the digital information is correct, the task is executed by the central processing unit 25 (FIG. 2). If the data segment of the digital information is in error, the task is ended and the central processing unit 25 returns to an idle state to await further information to read. If the data is correct and more data is required, the additional data without control information may be received by the central processing unit 25 via the computer terminal 20 as required by the task instructions loaded into the central processing unit 25.

Any information received by the central processing unit 25 that is not recognizable by the program (FIG. 2) or recognizable by the task instructions from the memory device 30 causes the central processing unit 25 to return to an idle state and the central processing unit 25 will receive succeeding digital information to begin a new cycle.

I claim:

1. A computer system in which a document displays alphanumeric characters representing control information and representing account identification information, said computer system comprising:
    (a) an optical character recognition device for reading in a single operational step said control information and said account identification information to produce therefrom digital control information and digital account identification information;
    (b) a memory device for storing a task library and for storing data from a plurality of accounts; and
    (c) a data processor receiving said digital control information for addressing a task in said task library to carry out the task addressed in said task library, said data processor receiving said digital account identification information for addressing the data of an account of said plurality of accounts identified by said digital account identification information to retrieve data from the account addressed for executing the task addressed.

2. A computer system according to claim 1 wherein said optical character recognition device reads substantially simultaneously said control information and said account identification information from said document.

3. A computer system according to claim 2 and comprising means responsive to the data retrieved by said data processor for displaying said retrieved data.

4. A computer system in which means on which information is recorded displays characters representing control information and representing predetermined input identification information, said computer system comprising:
    (a) a character recognition device for reading in a single operational step said control information and said predetermined input identification information to produce therefrom digital control information and digital source identification information; and
    (b) a computer with a memory device for storing a task library and for storing data from a plurality of sources, said computer receiving said digital control information for addressing a task in said task library to carry out the task addressed in said task library, said computer receiving said digital source identification information for addressing the data of a source of said plurality of sources identified by said digital source identification information to retrieve data from the source addressed for executing the task addressed.

5. A computer system according to claim 4 wherein said character recognition device reads substantially simultaneously said control information and said predetermined input identification information from said means.

6. A computer system according to claim 5 and comprising means responsive to the data retrieved by said computer for displaying said retrieved data.

* * * * *